No. 763,795. PATENTED JUNE 28, 1904.
J. H. RAVELLI.
WIND MOTOR.
APPLICATION FILED JULY 13, 1903.
NO MODEL. 3 SHEETS—SHEET 1.

WITNESSES
Walter Abby
T. W. Birckhead.

INVENTOR
Jacques Hyacinthe Ravelli
BY Hawson & Hawson
ATTORNEYS

No. 763,795. PATENTED JUNE 28, 1904.
J. H. RAVELLI.
WIND MOTOR.
APPLICATION FILED JULY 13, 1903.
NO MODEL. 3 SHEETS—SHEET 3.

WITNESSES

INVENTOR
Jacques Hyacinthe Ravelli
BY
ATTORNEYS

No. 763,795. Patented June 28, 1904.

UNITED STATES PATENT OFFICE.

JACQUES HYACINTHE RAVELLI, OF LYONS, FRANCE.

WIND-MOTOR.

SPECIFICATION forming part of Letters Patent No. 763,795, dated June 28, 1904.

Application filed July 13, 1903. Serial No. 165,388. (No model.)

*To all whom it may concern:*

Be it known that I, JACQUES HYACINTHE RAVELLI, commercial traveler, a citizen of the French Republic, and a resident of 17 Quai Jayr, Lyons, in the Department of Rhone and Republic of France, have invented a certain new and useful Improvement in Wind-Motors, of which the following is a full, clear, and exact description.

This invention relates to a construction and arrangement of wind-motor in which the force of the wind is utilized in the best possible conditions.

The subsequent description is given with reference to the annexed drawings, in which—

Figure 1:
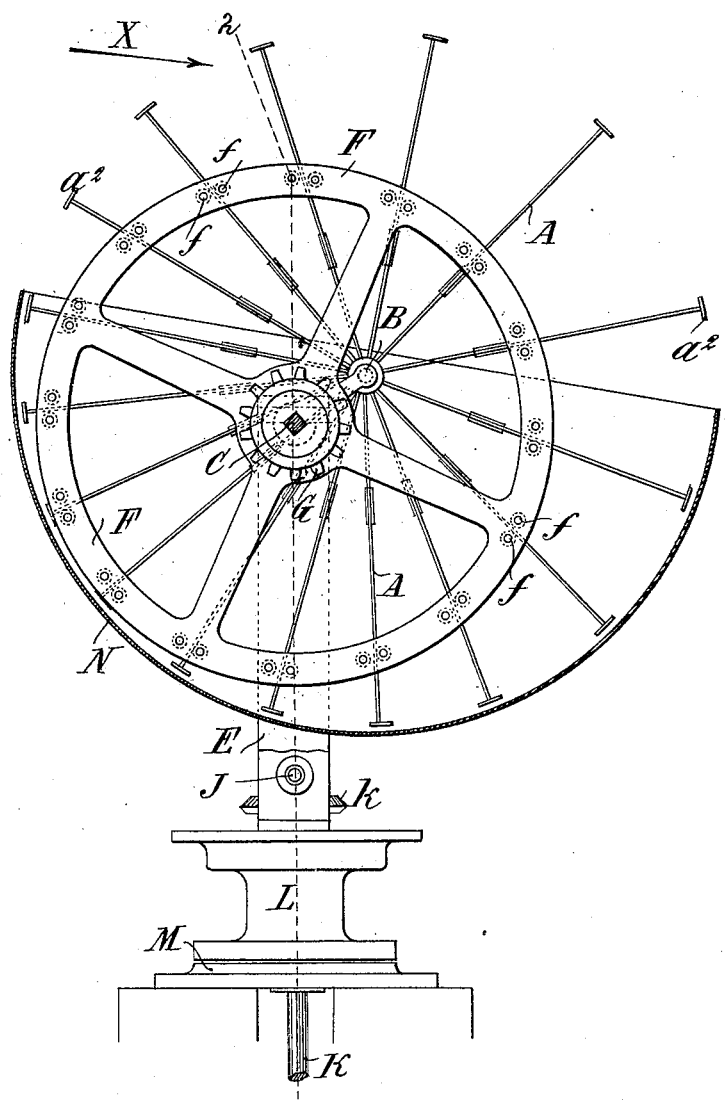
Figure 2:
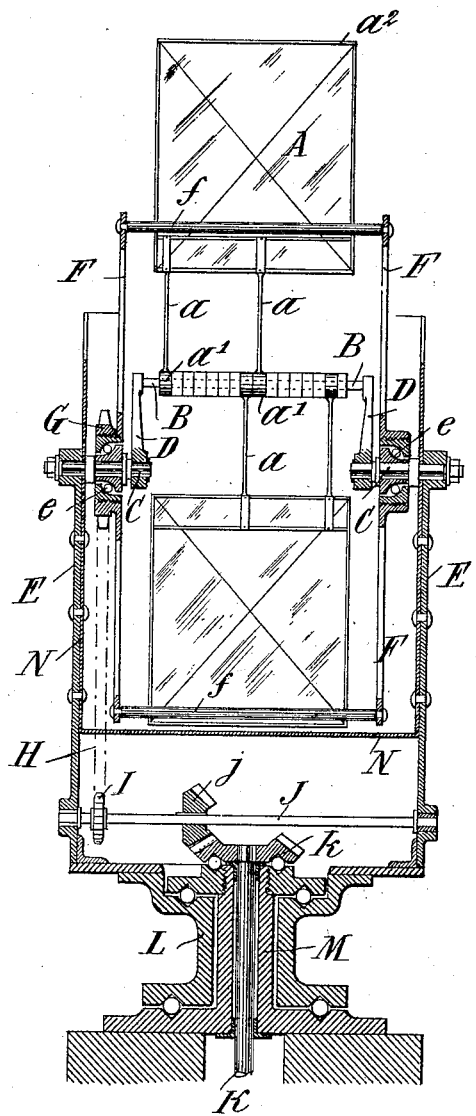
Figure 3:
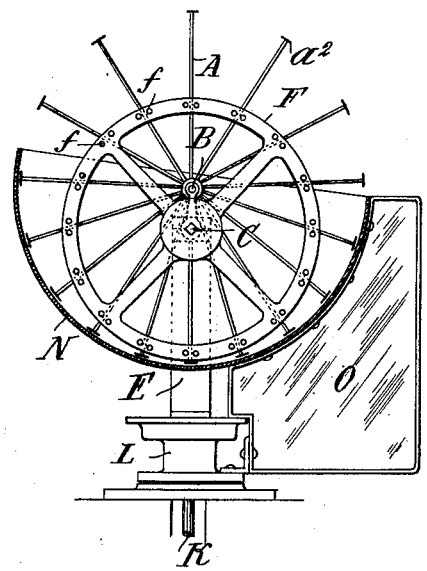

Figure 1 is an elevation, the drum in which the blades of the lower part are inclosed being in section. Fig. 2 is a vertical transverse section on line 2 2 of Fig. 1. Fig. 3 is a diagram relative to a modification.

In a wind-motor made according to the present invention the force of the wind is exerted on sails or wings in a plane perpendicular to the surface thereof, and those of the sails which are traveling opposite to the direction of the wind move in a chamber or drum in which they are sheltered, so that no resistance is caused by these sails and the force of the wind is utilized as completely as possible. The design of the arrangement takes into account the general direction of the winds, which direction is most frequently from above to below under an inclination of about fifteen degrees.

In the motor shown in Figs. 1 and 2 the sails or blades are sixteen in number; but this number may be varied according to circumstances, such as the size of the motor and the strength of the winds usually prevailing. These sails or blades A A are constructed in any suitable manner and may be of canvas stretched on a frame or of sheet metal. They each pivot on a fixed common axis B. For this purpose each blade is fixed to two rods $a$ $a$, ending in rings or collars $a'$, embracing the axis B. These collars may be of any desired construction and may be formed as ball-bearing hubs. Fig. 1 shows this construction for two blades and shows the rings $a'$ of the other blades, of which each is thus pivoted independently on the shaft B by two rings. The fixed shaft B is located eccentrically of an axis upon which are placed two fixed portions of shafts C, to which shaft B is made fast by two arms or cranks D D. These two fixed shafts C C are supported in a framework E, which supports the whole arrangement and which can swing horizontally around a vertical axis for the setting of the motor. Upon the fixed shafts C C are pivoted at $e$ two plates F, connected by cross-bars $f$, which arrangement thus forms a kind of cylindrical cage-drum. The bars $f$ are composed of rollers mounted on fixed rods which connect the two plates F F. They are divided out regularly over the whole circumference in as many sets of two as there are blades A to the apparatus, each of the blades being engaged between the two rollers $f$ forming each set. The blades are preferably terminated at their exterior edge by a small plate $a^2$, which prevents them from freeing themselves from the rollers $f$ when the circumference which they describe is substantially tangential to that of the drum formed by the plates F and rollers $f$. The transmission of the power afforded by the wind on the blades A is taken up on the cage-drum F $f$. In the motor illustrated this transmission consists of a toothed wheel G, fast to one of the plates F, connected by a chain H to another toothed wheel I, mounted on a shaft J, pivoted in the framework. This shaft is fitted with a bevel-pinion $j$, gearing with a pinion $k$, fast to a shaft K, located in the vertical axis of the arrangement, around which axis the motor can be set or moved horizontally. For this setting or horizontal rotation the frame E is fast to a cylinder L, mounted on a fixed support on which it can turn, preferably with the interposition of balls or rollers to reduce friction. The support M is fixed upon a metal tower or other erection or pillar of masonry of suitable height. To the framework F are fixed walls N, forming a cup or semicylindrical trough acting as a sheltering-drum in which are the lower blades passing back in a direction opposite to the wind and are thus sheltered therefrom.

When the motor is set and is acted on by the wind, the movable parts formed by the blades A and drum F f will commence to rotate, the blades being guided between the rollers f and driving the drum. The force of the wind is received by the transmission described. The blades after having been acted on pass into the drum N, where they are sheltered from the wind, and afterward emerge from the shelter and again take up the useful pressure of the wind.

It will be noted that the wind-motor thus constructed does not need a rudder or vane, because the drum N being unsymmetrical with relation to the vertical axis of the horizontal movement of the apparatus forms at its largest part (n on Fig. 1) practically a rudder by which the apparatus forms a vane by itself and turns into the wind.

Although the arrangement above described of the fixed shaft B relatively to the axis of the fixed shafts C C is advantageous in many cases, I may in certain instances place the shaft B above the axis of the shafts C C in the vertical plane passing through this axis. In such case the drum N would become symmetrical with the vertical axis K, and the motor would then be fitted with a separate rudder-vane. Such an arrangement is shown at O in Fig. 3.

The arrangement of wind-motor, which is the subject of the present invention, possesses the advantage of always receiving the wind behind and being acted on by it only in a useful manner by reason of the disappearance of the blades into the interior of the drum in which they are completely sheltered at the time of their return opposite to the direction of the wind. It also possesses the advantage when arranged as shown in Figs. 1 and 2, which I consider the most advantageous, of forming a rudder for itself. The apparatus then exhibits a compact whole and is substantial in construction and working, while previous windmills are of complicated and fragile construction.

The arrangement of this improved wind-motor possesses none of the complicated arrangements of ordinary windmills provided with means for putting the the mill out of condition to be acted on by the wind at the time of violent winds or tempests. Such violent winds have no danger for the wind-motor constructed according to the present invention, which can, indeed, work under all these conditions.

It should be understood that the invention is in no way limited to the details of construction shown and that these details can be varied without departing from the general arrangement. The mechanical details shown are given only by way of example, so as to illustrate the essential particulars of the invention.

I claim as my invention—

1. A wind-motor, having a semicylindrical trough, a shaft provided with a number of perpendicular frames rotating in the trough, and a support for said trough, eccentrically connected thereto, and gearing for transmitting motion from the shaft, substantially as described.

2. A wind-motor, having a semicylindrical trough, a shaft provided with a number of perpendicular blades, a plate and a shaft therefor eccentric to said blade-carrying shaft, said blades being adapted to engage with said plate and gearing for transmitting motion from said plate, substantially as described.

3. A wind-motor, having a semicylindrical trough, a shaft mounted on the axis of the semicylindrical trough, a number of perpendicular blades freely pivoted on said shaft, rotatable plates eccentrically placed with relation to said shaft, rollers connecting said plates, said blades passing freely between said rollers and gearing from said plates for transmitting motion, substantially as described.

4. A wind-motor, having a semicylindrical trough, a fixed shaft therein freely pivoted, perpendicular blades thereon, short shafts at each side of the trough, plates revoluble thereon, rollers connecting the plates, said blades passing between said rollers and gearing on the rotatable plates, substantially as described.

5. A wind-motor, having a semicylindrical trough, short shafts in the sides thereof secured eccentrically to the axis of the semicylindrical trough, fixed arms extending from said shafts and carrying a cross-shaft concentric to the axis of said semicylindrical trough, a number of perpendicular blades pivoted on said cross-shaft, plates mounted on said short shafts and rollers in pairs connecting said plates, a blade passing between each pair of rollers and gearing for transmitting motion from the plates, substantially as described.

In testimony whereof I have signed my name to this specification in the presence of two subscribing witnesses.

JACQUES HYACINTHE RAVELLI.

Witnesses:
CLAUDE MICHEL,
LEOIS CALMELS.